(12) United States Patent
Willsey

(10) Patent No.: US 9,657,490 B1
(45) Date of Patent: *May 23, 2017

(54) UNIVERSAL PANELS AND STRUCTURES COMPRISED OF THE SAME

(71) Applicant: Charles K Willsey, Tulsa, OK (US)

(72) Inventor: Charles K Willsey, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/186,154

(22) Filed: Jun. 17, 2016

Related U.S. Application Data

(63) Continuation-in-part of application No. 14/499,076, filed on Sep. 26, 2014, now Pat. No. 9,394,714.

(51) Int. Cl.
| | | |
|---|---|---|
| *E04H 9/14* | (2006.01) | |
| *H04B 1/02* | (2006.01) | |
| *E04H 1/00* | (2006.01) | |
| *E04B 1/343* | (2006.01) | |
| *E05B 65/00* | (2006.01) | |
| *E04B 1/02* | (2006.01) | |
| *E04B 5/02* | (2006.01) | |
| *E04C 2/52* | (2006.01) | |
| *E06B 3/70* | (2006.01) | |
| *E04B 2/00* | (2006.01) | |

(52) U.S. Cl.
CPC ............. *E04H 9/14* (2013.01); *E04B 1/02* (2013.01); *E04B 1/34321* (2013.01); *E04C 2/46* (2013.01); *E04C 2/50* (2013.01); *E04C 2/523* (2013.01); *E04H 1/005* (2013.01); *E06B 3/70* (2013.01)

(58) Field of Classification Search
CPC ... E04H 9/14; E04H 1/005; E04B 1/02; E04B 1/34321; E05B 65/0075
See application file for complete search history.

(56) References Cited

U.S. PATENT DOCUMENTS

| | | | | | |
|---|---|---|---|---|---|
| 1,511,455 | A | * | 10/1924 | Freyberg | E05B 65/0075 109/59 R |
| 2,793,401 | A | * | 5/1957 | Paschke | E04H 1/12 52/264 |
| 3,566,554 | A | * | 3/1971 | Schaffer | E04B 1/34815 52/234 |
| 4,115,656 | A | * | 9/1978 | Aitel | H05K 9/0018 174/380 |
| 4,231,203 | A | * | 11/1980 | Mikkelsen | F16B 12/46 217/65 |
| 4,389,948 | A | * | 6/1983 | Sands | E05G 1/024 109/79 |
| 4,559,881 | A | * | 12/1985 | Lankard | B28B 23/00 106/644 |
| 5,052,569 | A | * | 10/1991 | Cooper | B65D 90/24 220/1.5 |

(Continued)

*Primary Examiner* — Rodney Mintz
(74) *Attorney, Agent, or Firm* — John M. Behles

(57) ABSTRACT

Embodiments of the present technology provides universal panels and structures made from the same. The panels are formed using specific ratios for width and length of the panels, which are related to ratios of aperture spacings for the panels. These ratios are used to ensure that panels can be used in a universal manner to form walls, roofs, and doors. Additionally, the universality of the panels reduces the likelihood that installation errors will occur when building structures with these panels. Installation errors can deleteriously affect the structural integrity of the the resulting structure.

16 Claims, 14 Drawing Sheets

(56) References Cited

U.S. PATENT DOCUMENTS

| | | | | |
|---|---|---|---|---|
| 5,386,788 A * | 2/1995 | Linker | .................... | E05G 1/024 109/58 |
| 5,746,038 A * | 5/1998 | Houk | ....................... | E04B 1/02 446/116 |
| 5,768,845 A * | 6/1998 | Beaulieu | ............... | E04B 1/6158 403/188 |
| 6,006,681 A * | 12/1999 | Brown | .................... | E05G 7/008 109/10 |
| 6,415,557 B1 * | 7/2002 | McCalley | ................ | E04B 1/08 109/1 S |
| 6,415,558 B1 * | 7/2002 | Cherry | .................... | E04H 9/14 292/138 |
| 6,786,009 B1 * | 9/2004 | McGunn | ................ | A47B 47/03 312/263 |
| 7,690,159 B1 * | 4/2010 | Arnold | ................ | A01K 1/0035 108/35 |
| 8,001,740 B2 * | 8/2011 | Smith | ...................... | F41H 5/24 52/106 |
| 8,307,608 B2 * | 11/2012 | Harig | ................ | B67D 7/0272 52/481.1 |
| 8,322,085 B2 * | 12/2012 | Plumley | ................ | E04B 1/161 52/169.6 |
| 8,628,158 B2 * | 1/2014 | Caveney | ............ | H05K 7/20745 312/204 |
| 8,769,908 B1 * | 7/2014 | Santini | ...................... | E04C 2/38 446/123 |
| 8,776,453 B1 * | 7/2014 | Fain | .......................... | E04C 2/08 109/1 S |
| 8,925,255 B1 * | 1/2015 | Haun | ...................... | E04D 3/366 52/91.1 |
| 9,394,714 B1 | 7/2016 | Willsey | | |
| 2005/0284344 A1 * | 12/2005 | Alizade | ............... | E05B 65/0075 109/49.5 |
| 2006/0115796 A1 * | 6/2006 | Riermann | ............. | F41H 5/0457 434/11 |
| 2009/0293420 A1 * | 12/2009 | Smith | ...................... | F41H 5/24 52/783.1 |
| 2010/0115858 A1 * | 5/2010 | Olsen | ........................ | E04H 9/14 52/79.1 |
| 2012/0073215 A1 * | 3/2012 | Zhang | ................ | E04B 1/34321 52/79.9 |
| 2012/0073233 A1 * | 3/2012 | Harrington | ............... | E04B 2/72 52/582.1 |
| 2012/0181906 A1 * | 7/2012 | Caveney | ............ | H05K 7/20745 312/237 |
| 2013/0091783 A1 * | 4/2013 | Reinmann, Jr. | ........... | E04H 9/16 52/79.5 |
| 2014/0123572 A1 * | 5/2014 | Segall | .................... | G09B 9/003 52/79.5 |

\* cited by examiner

UNIVERSAL PANELS AND STRUCTURES COMPRISED OF THE SAME

CROSS REFERENCE TO RELATED APPLICATIONS

This application claims the benefit and priority of, and is a continuation-in-part of U.S. application Ser. No. 14/499,076, filed on Sep. 26, 2014, which is hereby incorporated by reference herein in its entirety including all references and appendices cited therein.

FIELD OF THE PRESENT TECHNOLOGY

The present technology relates generally to universal panel structures, and more specifically, but not by way of limitation to panels that are formed using specific ratios for width and length of the panels, which are related to ratios of aperture spacings for the panels. These ratios are used to ensure that panels can be used in a universal manner to form walls, roofs, and doors (e.g., structures). The universality of the panels reduces the likelihood that installation errors will occur when building structures with these panels.

SUMMARY

Embodiments of the present technology include an enclosure, comprising: (a) four walls comprised of a plurality of panels, each panel comprising: (i) a sheet of metal having a length, width, a top flange, a bottom flange, a first edge flange, and a second edge flange, the first edge flange comprising a first plurality of apertures located in spaced apart relation along a first plane of symmetry of the panel, the second edge flange comprising a second plurality of apertures located in spaced apart relation along a second plane of symmetry of the panel, wherein a first of the first plurality of apertures of the first edge flange is located at a distance that is approximately one twentieth of the length of the panel from a top end of the panel, a last of the first plurality of apertures of the first edge flange is located at a distance that is approximately one twentieth of the length of the panel from a bottom end of the panel, wherein a first of the second plurality of apertures of the second edge flange is located at a distance that is approximately one twentieth of the length of the panel from the top end of the panel, a last of the second plurality of apertures of the second edge flange is located at a distance that is approximately one twentieth of the length of the panel from the bottom end of the panel; (ii) wherein the plurality of panels are arranged side-to-side in such a way that the second plurality of apertures of the second edge flange of one panel of the first plurality of panels are aligned with the plurality of apertures of the first edge flange of an adjacent panel; (iii) wherein the plurality of panels are arranged into the four walls each of the four walls comprising a first end panel having a first end flange that is not joined to another discrete panel on the first end flange and a second end panel having a second end flange that is not joined to another discrete panel on the second end flange, and L-shaped corner members join only two of the four walls together, wherein each said L-shaped corner member comprises apertures that mate with the first end flange of the first end panel of one of the walls and the second end flange of the second end panel of a second one of the walls; and (iv) wherein the four walls are arranged to form the enclosure in such a way that all apertures are disposed in an interior of the enclosure.

Other embodiments of the present technology comprise an enclosure, comprising: (a) four walls comprised of a plurality of panels, each panel comprising: (i) a sheet of metal having a length, width, a top flange, a bottom flange, a first edge flange, and a second edge flange, the first edge flange comprising a first plurality of apertures located in spaced apart relation along a first plane of symmetry of the panel, the second edge flange comprising a second plurality of apertures located in spaced apart relation along a second plane of symmetry of the panel, wherein a first of the first plurality of apertures of the first edge flange is located at a distance that is approximately one twentieth of the length of the panel from a top end of the panel, a last of the first plurality of apertures of the first edge flange is located at a distance that is approximately one twentieth of the length of the panel from a bottom end of the panel, wherein a first of the second plurality of apertures of the second edge flange is located at a distance that is approximately one twentieth of the length of the panel from the top end of the panel, a last of the second plurality of apertures of the second edge flange is located at a distance that is approximately one twentieth of the length of the panel from the bottom end of the panel; (ii) wherein the plurality of panels are arranged side-to-side in such a way that the second plurality of apertures of the second edge flange of one panel of the first plurality of panels are aligned with the plurality of apertures of the first edge flange of an adjacent panel; (iii) wherein the plurality of panels are arranged into the four walls each of the four walls comprising at least one panel having a first end flange that is not joined to another discrete panel on the first end flange and a second end panel having a second end flange that is not joined to another discrete panel on the second end flange, and L-shaped corner members join only two of the four walls together, wherein each said L-shaped corner member comprises apertures that mate with the first end flange of the at least one panel of one of the walls and the second end flange of the second end panel of a second one of the walls; and (iv) wherein the four walls are arranged to form the enclosure.

DETAILED DESCRIPTION

Generally, the present technology is directed to universal panels that can be arranged in various configurations to form walls, enclosures and/or other similar structures. In some instances, a plurality universal panels are arranged to form a storm shelter. Advantageously, the universality of the panel construction ensures that shelters are constructed correctly and consistently, reducing the likelihood that structural failures will occur due to installation errors. For example, storm shelters manufactured from components that are not universal in nature may fail when components are installed improperly due to manufacturing discrepancies with the components such as misaligned bolt holes and/or poorly fitting components that are supposed to mate together. Additionally, installation errors can reduce the structural integrity of the storm shelter. For example, if certain bolt holes that are supposed to align are misaligned during installation, an installer may attempt to drill new bolt holes or modify the existing holes. These types of modifications can deleteriously impact the strength of the structure by creating potential failure points.

Advantageously, the present technology provides a panel that is universal with respect to the creation of structures therefrom. A plurality of panels of the present technology can be joined together side edge to side edge irrespective of whether the panels are oriented in an upright configuration or a downward configuration, relative to one another. The panels can also be used to create a roof and/or door for the structure, without any structural modification to the panel. Indeed, the universality of the panels provides for installation in a foolproof manner, ensuring the strength and structural integrity of the resulting structure.

Figure 1:
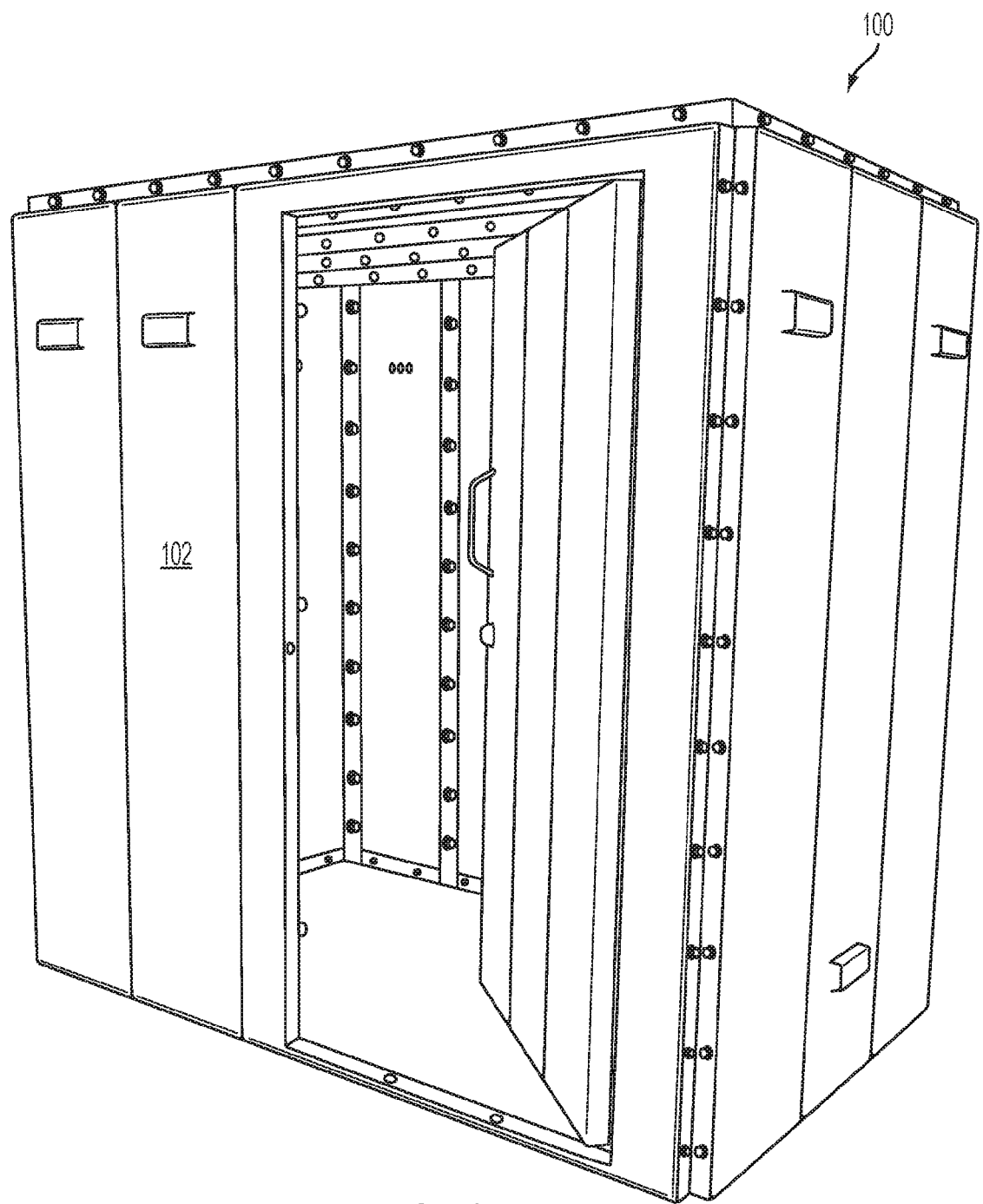
FIG. 1 is a perspective view of an example structure, constructed from a plurality of panels, which are fabricated in accordance with the present disclosure.

Referring now to FIG. 1, an example structure 100 is illustrated. The structure 100 is comprised of a plurality of panels, such as panel 102. The plurality of panels are attached together to form the structure 100, which in this example is a safe room such as a tornado shelter. In some embodiments, the panels are designed such that the structure 100 is capable of withstanding the impact force of debris from an F-5 tornado.

Figure 2A:
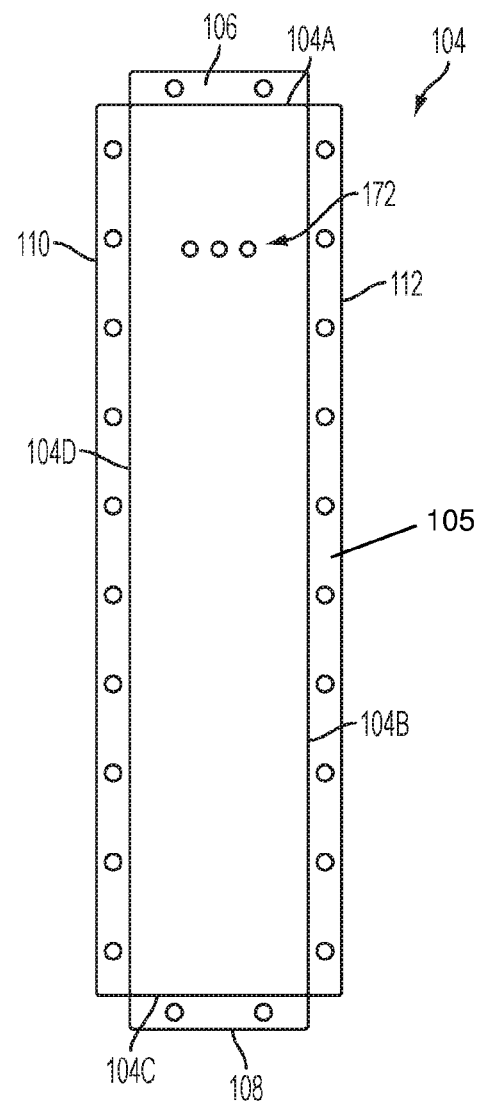
FIG. 2A is a top down view of a sheet of material used to construct a panel of the present technology.
Figure 2B:
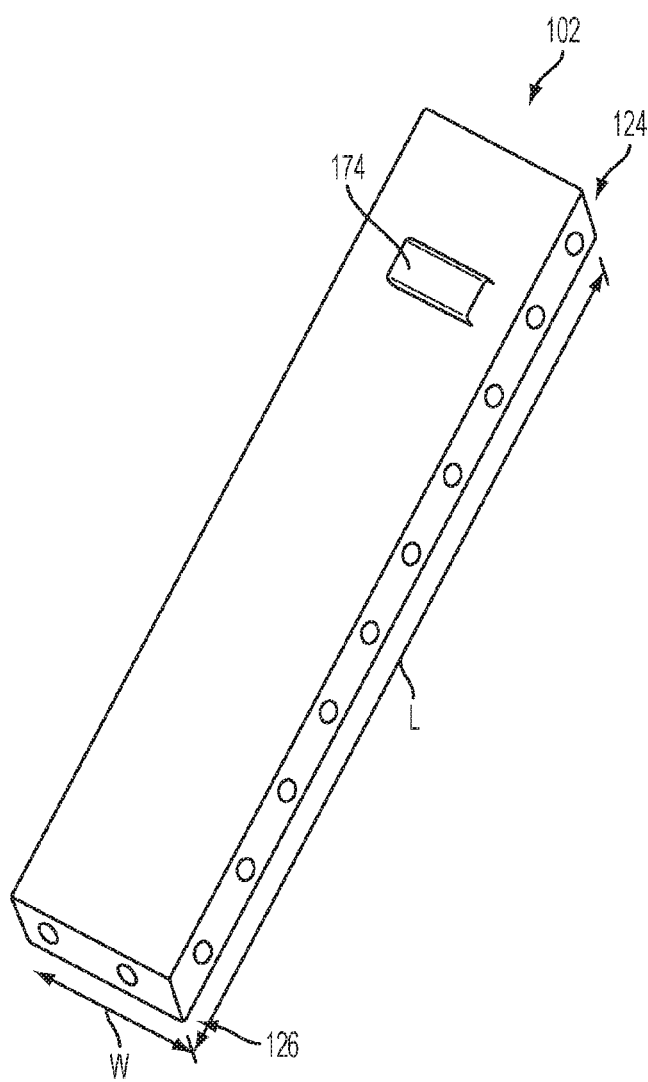
FIG. 2B is a perspective view of the panel of FIG. 2A.
Figure 2C:
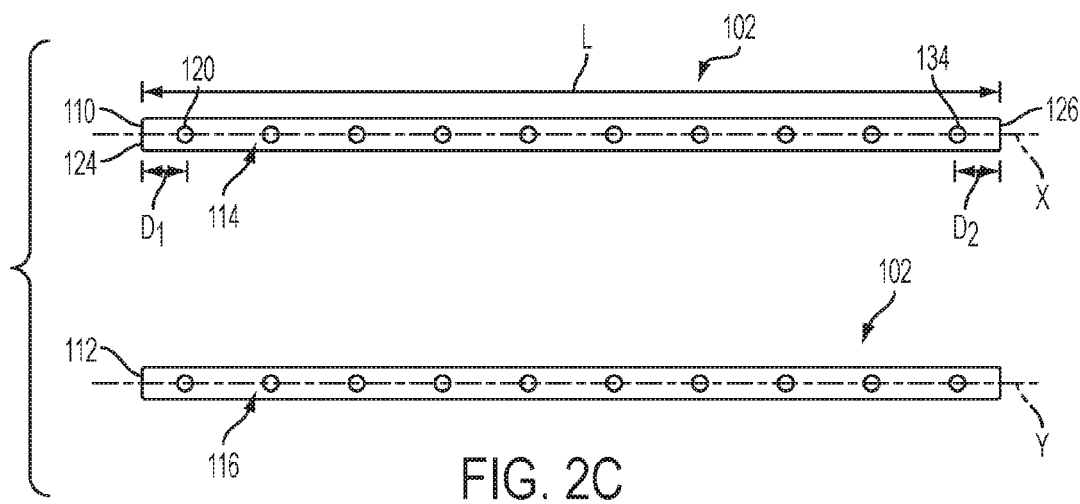
FIG. 2C is a side elevational view of each side flange the panel of FIGS. 2A-B.
Figure 2D:
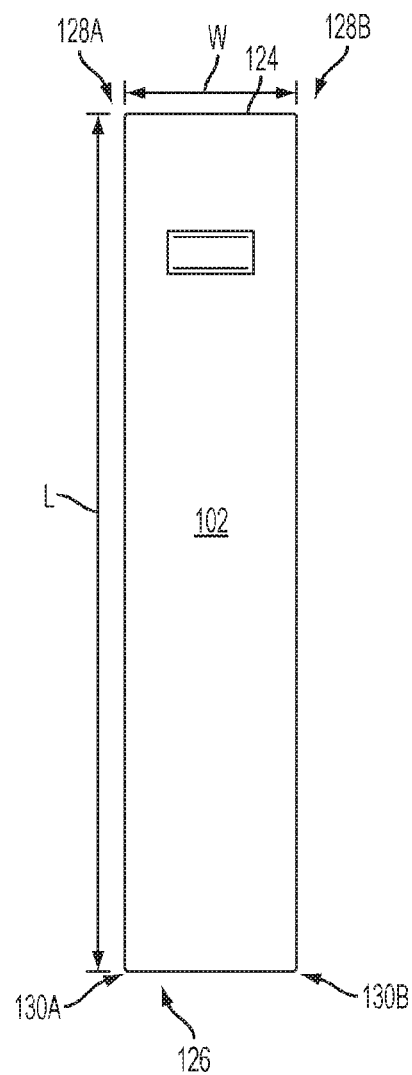
FIG. 2D is a front plan view of the panel of FIGS. 2A-C.

Referring now to FIGS. 2A, 2B, and 2D, the panel 102 is illustrated in greater detail. The panel 102 is constructed from a sheet of material 104 such as metal, which is laser or machine cut to specified dimensions. The panel 102 can be constructed from an alloy or a composite material such as carbon fiber or other sufficiently strong materials. The required strength of materials is based upon the ultimate use of the panel and/or structure. For example, if the desired use is storm protection, the material chosen needs to withstand certain forces.

The sheet of material 104 is cut to create flange panels, such as flange panel 105 that are used to form a top flange 106, a bottom flange 108, a first edge flange 110 and a second edge flange 112.

The sheet of material 104 is bent along bend lines 104A-D to fold the flange panels and form the top flange 106, the bottom flange 108, the first edge flange 110 and the second edge flange 112.

After creation of the flanges, the panel 102 comprises an overall length L and an overall width W. The length is measured from a top end 124 to a bottom end 126. The width W is measured from a first edge 128A of the top end 124 to a second edge 128B of the top end 124. The width of the panel 102 is also consistent down to the bottom end 126 of the panel 102, extending between a first edge 130A of the bottom end 126 to a second edge 130B of the bottom end 126.

In one embodiment, a ratio between the length L and width W is maintained to ensure that panels can be used in a universal manner. For example, the width W is one fifth of overall length L. In one example, the overall length L is eighty inches and the width W is sixteen inches.

As will be described in greater detail below, the ratio between the length L and width W of the panel, as well as the spacing of apertures on the flanges 106, 108, 110, and 112 ensures that panels can be used universally to form walls, a roof, and/or a door.

Each of the flanges 106, 108, 110, and 112 is provided with apertures that are configured to receive bolts for joining a respective flange to another flange of another panel, as will be described in greater detail below.

In FIG. 2C, the first edge flange 110 comprises a plurality of apertures 114 located in spaced apart relation along a first plane of symmetry X of the panel 102. Similarly, the second edge flange 112 comprises a plurality of apertures 116 that are located in spaced apart relation along a second plane of symmetry Y of the panel 102. In some embodiments, the plurality of apertures 114 associated with the first plane of symmetry X and the plurality of apertures 116 associated with the second plane of symmetry Y are aligned with one another.

According to some embodiments, a first 120 of the plurality of apertures 114 of the first edge flange 110 is located at a distance D1 that is approximately one twentieth of the length L of the panel 102 from the top end 124 of the panel 102.

A last 134 of the plurality of apertures 114 of the first edge flange 110 is located at a distance D2 that is approximately one twentieth of the length L of the panel 102 from the bottom end 126 of the panel 102. For example, if the overall length L of the panel 102 is 80 inches, D1 for the first 120 of the plurality of apertures 114 is four inches. Again, D1 is measured from the top end 124 of the panel 102. This is a second ratio for the panel 102. Thus, the panel 102 has two unique ratios that allow the panel 102 to be used in a universal manner, where the width W is one fifth of the length L of the panel and the distances D1 and D2 are one twentieth of the length L of the panel 102 (where D1=D2).

Thus, D2 of the last 134 of the plurality of apertures 114 is also four inches, but D2 is measured from the bottom end 126 of the panel 102.

Remaining ones of the plurality of apertures 114 are spaced apart from one another at eight inches. Apertures that are adjacent to the first 120 and last 134 are also spaced at a distance of eight inches from the first 120 and last 134 apertures.

A third unique ratio is used for the remaining ones of the plurality of apertures, which is one-tenth the overall length L of the panel 102.

Figure 2E:
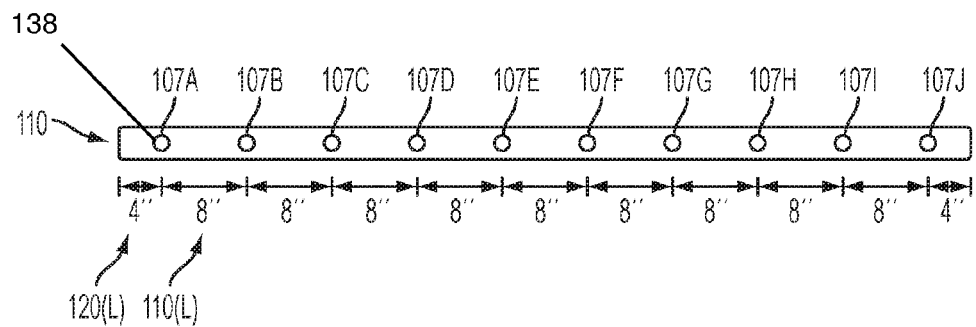
FIG. 2E is a side elevational view of a side flange of the panel of FIGS. 2A-C.

FIG. 2E illustrates the spacing of a plurality of apertures 107A-J for an example edge flange of a panel 102. Apertures 107A and 107J are located at distances that are one twentieth of the overall length L of the panel 102. These distances are measured relative to the nearest end edge. The remaining apertures 107B-I are spaced equidistantly from one another as well as from apertures 107A and 107J. For example, aperture 107B is located at 12 inches from the upper end of the panel 102 and eight inches from aperture 107A. Aperture 107C is located eight inches from aperture 107B. Aperture 107D is located eight inches from aperture 107C, while aperture 107E is located eight inches from aperture 107D. Aperture 107F is located eight inches from aperture 107E, while aperture 107G is located eight inches from aperture 107F. Aperture 107H is located eight inches from aperture 107G, while aperture 107I is located eight inches from aperture 107H. Aperture 107I is located at twelve inches from the bottom end of the panel 102 and eight inches from aperture 107J.

As mentioned above, the spacing of apertures is identical between the first and second edge flanges of a panel 102.

The apertures 116 of the second edge flange 112 are laid out identically to the apertures 114 of the first edge flange 110. A first 138 of the plurality of apertures 116 of the second edge flange 112 is located at a distance D2 that is approximately one twentieth of the length L of the panel 102 from the top end 124 of the panel 102.

A last 140 of the plurality of apertures 116 of the second edge flange 112 is located at a distance D2 that is approximately one twentieth of the length L of the panel 102 from the bottom end 126 of the panel 102.

It will be understood that D1 is identical to D2, ensuring that the first 120 and last 134 of the plurality of apertures 114 of the first edge flange 110 are aligned with the first 138 and last 140 of the plurality of apertures 116 of the second edge flange 112, respectively.

Figure 3A:
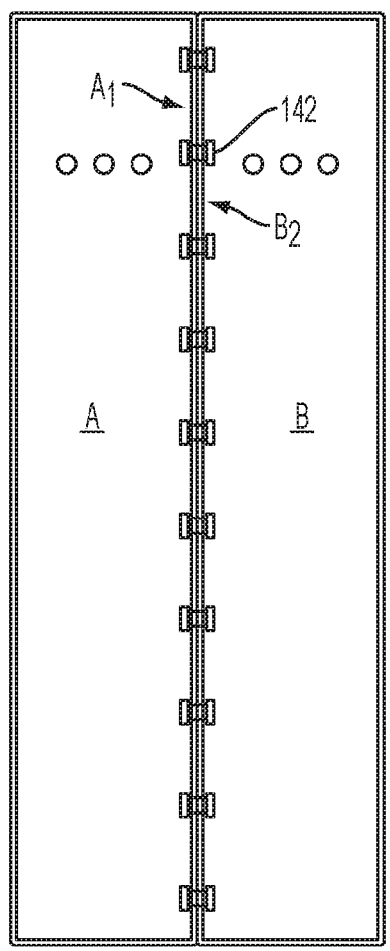
FIG. 3A is a rear view of two panels joined together, where the flanges of the panels extend in the same direction.

Referring now to FIG. 3A, it will be understood that the alignment of apertures between first and second edge flanges of a panel ensure that when two panels A and B are joined together, the apertures of the edge flanges of the panels A and B align.

Broadly stated, a plurality of panels can be arranged side-to-side in such a way that the plurality of apertures of the second edge flange of a panel of the plurality of panels are aligned with the plurality of apertures of the first edge flange of an adjacent panel. A single panel can be joined to two other panels, one on the first edge flange of the single panel and the other on the second edge flange of the single panel.

For example, the first edge flange A1 of panel A is mated with the second edge flange B2 of panel B.

Figure 3B:
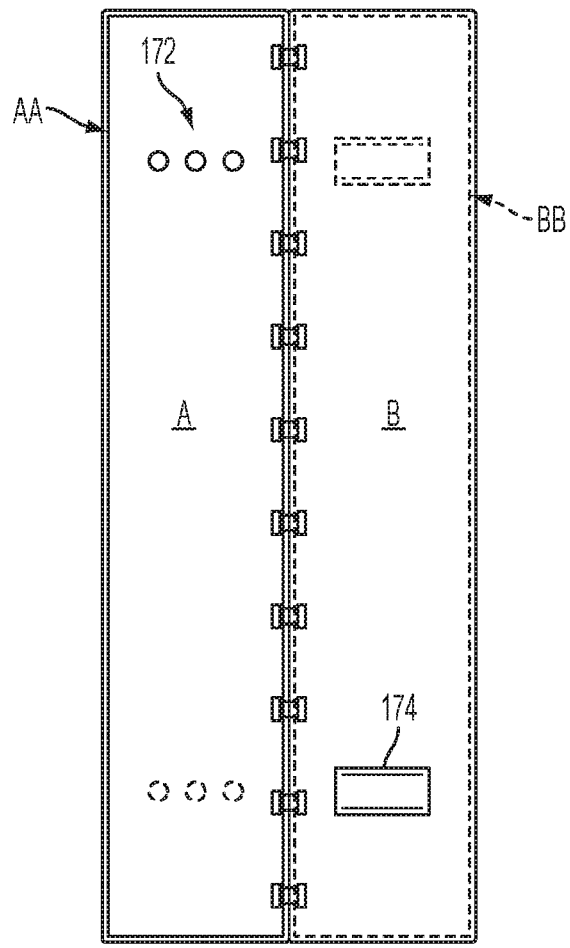
FIG. 3B is a rear view of two panels joined together, where the flanges of the panels extend in different directions.

Again, the apertures of the panels align irrespective of whether a first panel is oriented upright (top end pointed up) and a second panel is oriented downwardly (top end pointed downwardly) such that cover plate 174 of panel B is below vent holes 172 of panel A. Also, alignment of the apertures between a first and a second panel is unaffected when the first panel A is oriented with its flanges AA facing outwardly and the second panel B is oriented with its flanges BB facing inwardly, as in FIG. 3B. To be sure, as long as the first and second panels are brought together such that at least one of the edge flanges touches an edge flange of the other panel, the panels can be secured together using fasteners.

Example fasteners 142 are illustrated in FIG. 3A. The fastener 142 can comprise a bolt with a nut. The head of the bolt is positioned on one flange of one panel, while the nut is positioned on the flange of the other panel.

The use of bolts as fasteners is advantageous at least because the shelter 100 can be quickly disassembled if needed. Also, the size of the structure 100 can be changed by adding or subtracting panels, as needed. The use of bolts as fasteners allows for resizing of the structure 100 without the need to completely dismantle and/or rebuild the structure. For example, if the structure is comprised of four walls, the structure can be resized by adding another panel to each wall.

Figure 4:
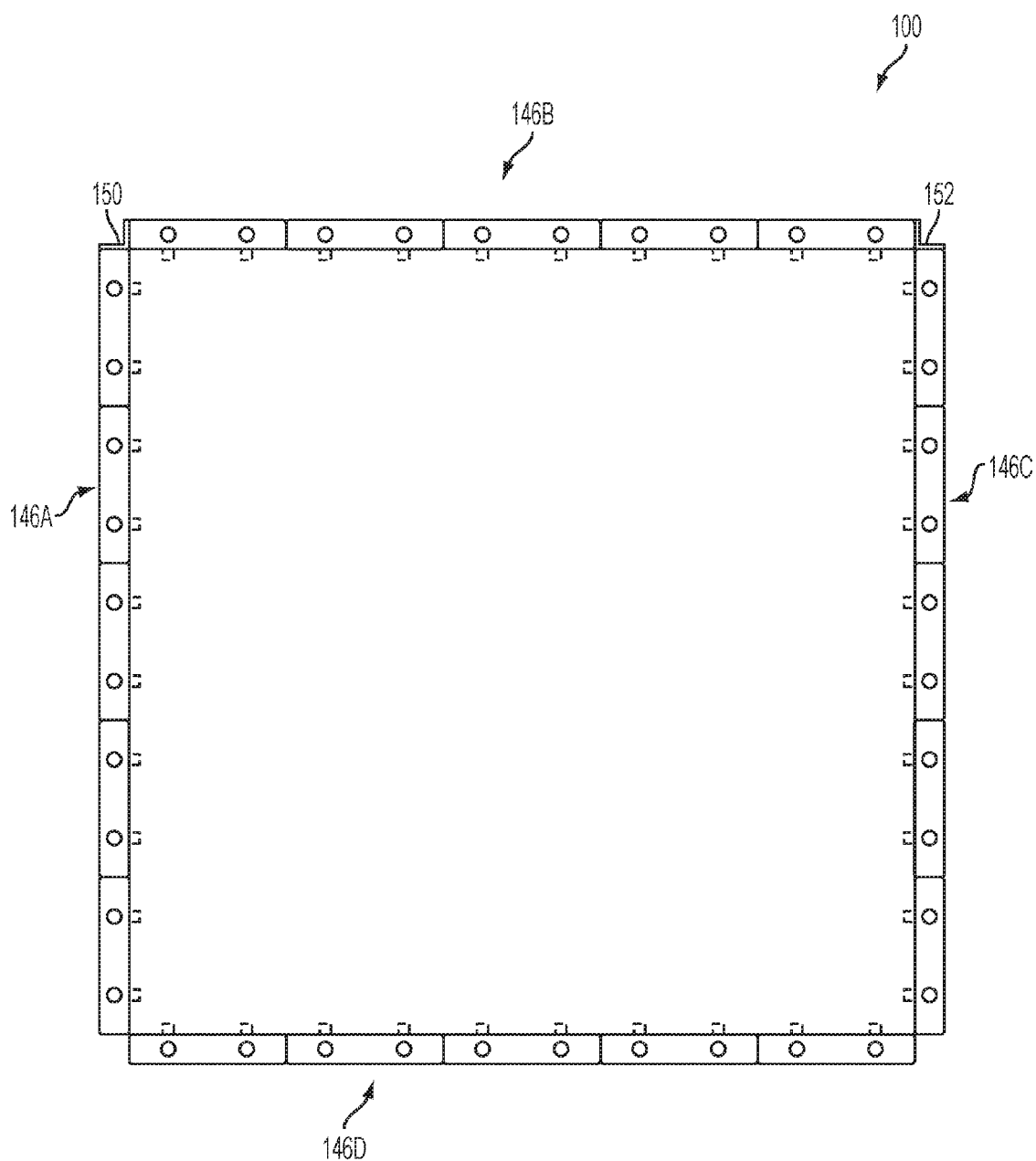
FIG. 4 is a top down view of the structure of FIG. 1, with a roof removed.

Referring now to FIG. 4, a top down view of the structure 100 of FIG. 1 is illustrated, with a roof of the structure 102 removed. The structure 100 has four walls 146A-D, where each wall is constructed from a plurality of panels, such as panel 102 of FIGS. 2A-D. Each wall is coupled to two adjacent walls using a channel. For example, wall 146A is attached to wall 146B using a channel 150, while wall 146A is attached to wall 146D using a channel 152. The L-shaped channels form the four corners of the structure 100.

Figure 5:
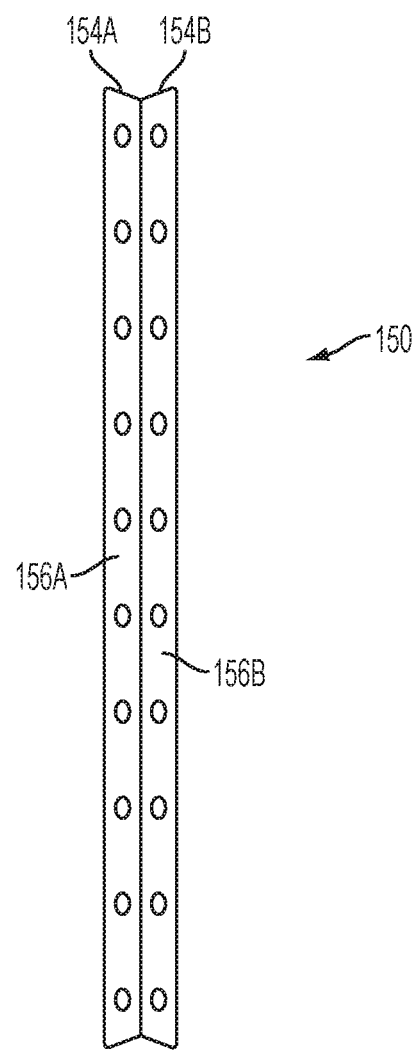
FIG. 5 is a top down view of a plurality of panels that form a wall.

In FIG. 5, a channel, such as channel 150 comprises an L-shaped channel that comprises plates 154A and 154B that each comprise apertures 156A and 156B, respectively. The apertures 156A and 156B are spaced identically to the apertures of the first and second edge flanges of a panel of the structure 100. By way of example, the plate 154A of the L-shaped channel 150 mates with an edge flange of the wall 146A. The plate 156A of the L-shaped channel 150 mates with an edge flange of the wall 146B.

Figure 2F:
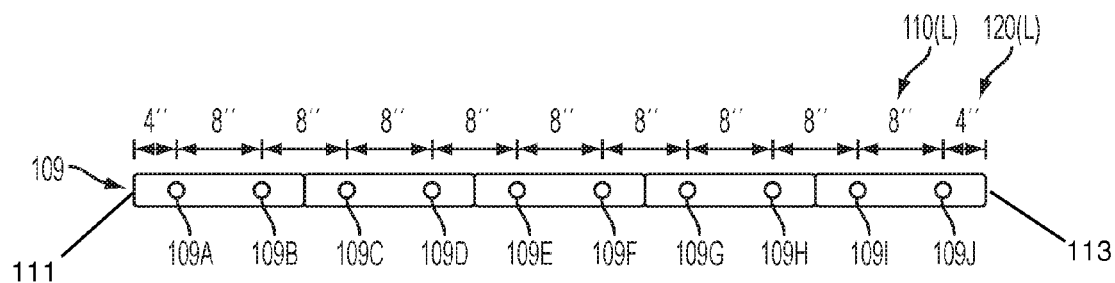
FIG. 2F is a top down view of a wall, comprised of a plurality of panels.
Figure 2G:
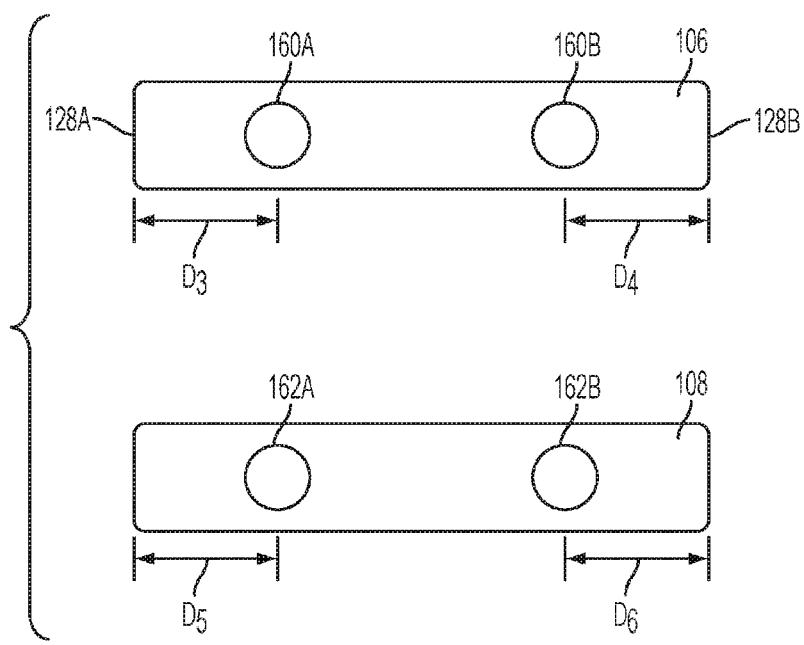
FIG. 2G. is a top down view of the panel of FIGS. 2A-C.

Referring to FIG. 2G, the top flange 106 and bottom flange 108 of each panel 102 includes a pair of apertures. For example, top flange 106 comprises apertures 160A and 160B, while bottom flange 108 comprises apertures 162A and 162B.

The aperture 160A of the pair of apertures is spaced apart from the first edge 128A of the top flange 106 at a distance D3 that is approximately one twentieth of the length L of the panel 102. The aperture 160B of the pair of apertures is spaced apart from the second edge 128B of the top flange 106 at a distance D4 that is approximately one twentieth of the length L of the panel 102. It will be understood that D1, D2, D3, and D4 are identical in size such that D1=D2=D3=D4, where D1 is approximately ½₀ of the overall length L of the panel 102.

The apertures 162A and 162B are located on the bottom flange 108 at distances D5 and D6, respectively. These distances D5 and D6 are also identical in size to D1, such that D1=D2=D3=D4=D5=D6.

It will be understood that the spacing of the apertures 160A and 160B of the top flange 106 will create an aperture spacing that is identical to the spacing of apertures of the edge flanges, such as first edge flange 110 and second edge flange 112 of the panel 102.

In FIG. 2F, a plurality of panels is illustrated as joined together to form a wall. The spacing of the pair of apertures of each top flange is one twentieth of the length L of the panel from their respective edges. When multiple panels are joined, the first and last apertures are located at one twentieth of the length L of the panel from the nearest edge surface, while apertures between the first and last apertures are spaced at one tenth of the length L of the panel (between adjacent apertures).

More specifically, the spacing of a plurality of apertures 109A-J for a plurality of panels that have been joined together to form a wall 109 is illustrated. Apertures 109A and 109J are located at distances that are one twentieth of the overall length L of a panel of the wall 109. These distances are measured relative to the nearest end edge. The remaining apertures 109B-I are spaced equidistantly from one another as well as from apertures 109A and 109J. For example, aperture 109B is located at 12 inches from a first edge 111 of the wall 109 and eight inches from aperture 109A. Aperture 109C is located eight inches from aperture 109B. Aperture 109D is located eight inches from aperture 109C, while aperture 109E is located eight inches from aperture 109D. Aperture 109F is located eight inches from aperture 109E, while aperture 109G is located eight inches from aperture 109F. Aperture 109H is located eight inches from aperture 109G, while aperture 109I is located eight inches from aperture 109H. Aperture 109I is located at twelve inches from a second edge 113 of the wall 109 and eight inches from aperture 109J.

Referring collectively to FIGS. 2E and 2F, the apertures of 107A-J of the first flange 110 align with the apertures 109A-J of the wall 109. Thus, a wall formed from a plurality of panels can be mated with a single panel that runs perpendicular to the wall. The single panel is often associated with another wall, such as a roof or floor.

Figure 6A:
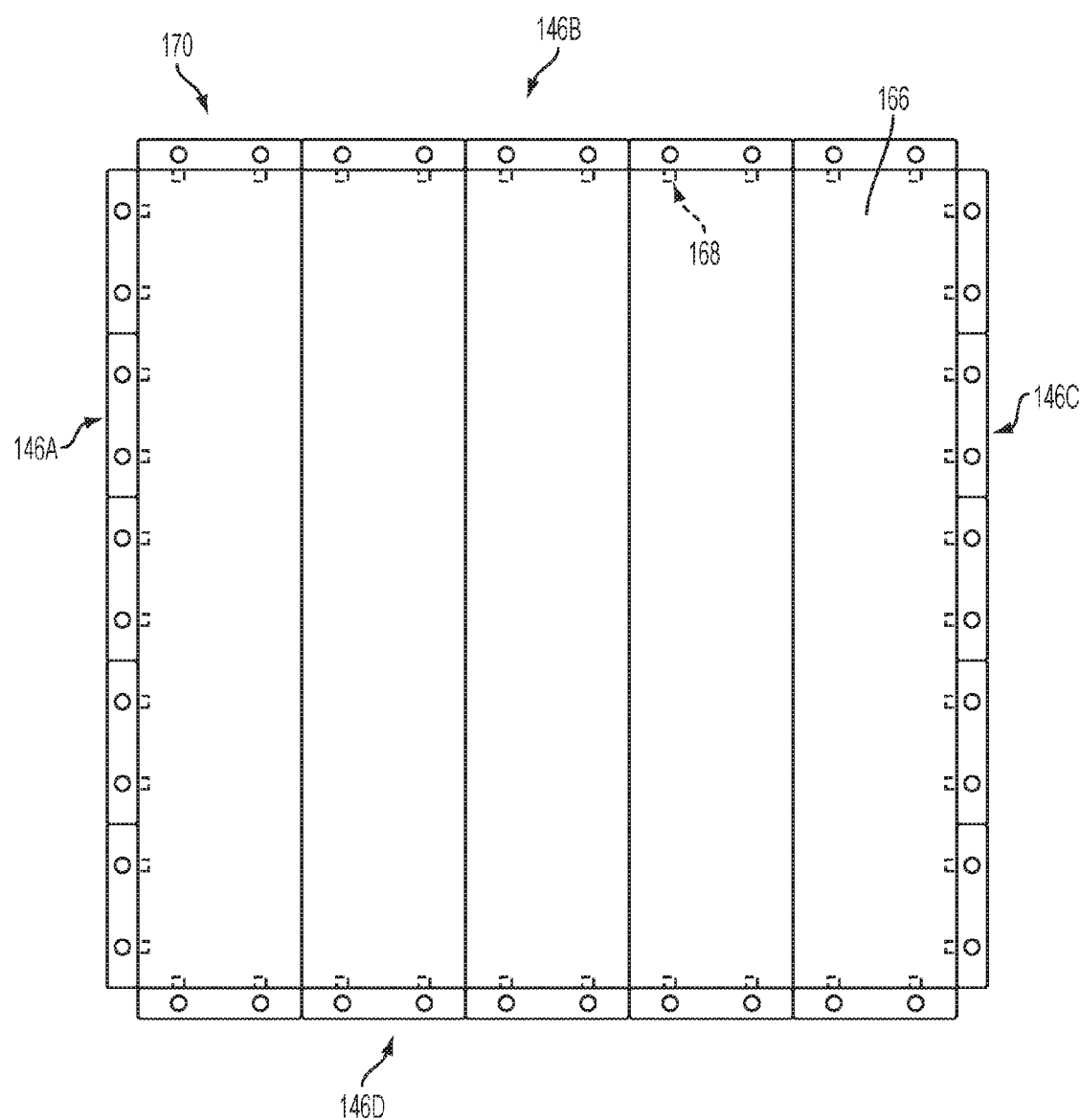
FIG. 6A is a top down view of an example roof, constructed from a plurality of panels, the roof being joined to an enclosure comprised of walls.
Figure 6B:
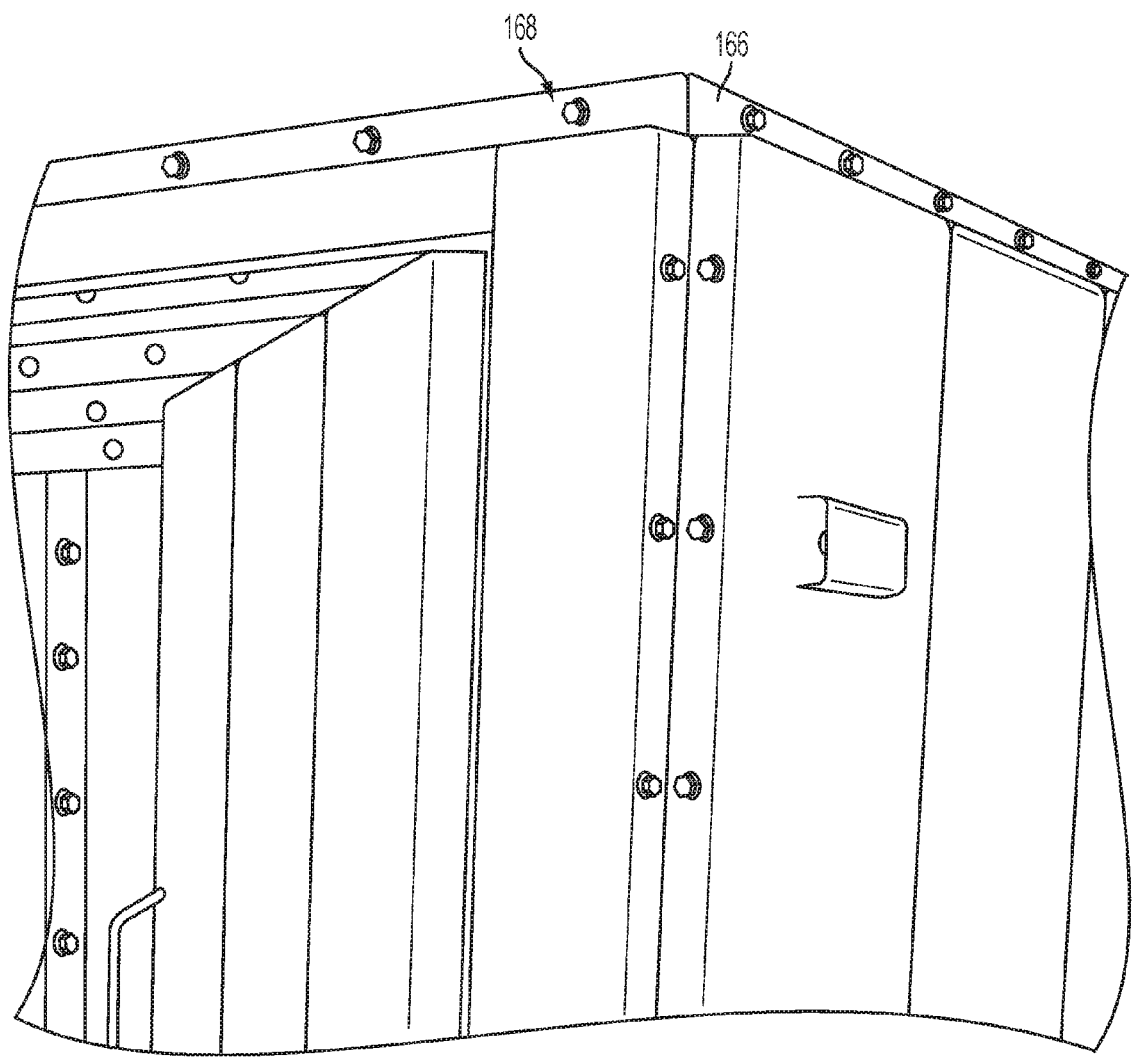
FIG. 6B is a perspective view of a portion of the roof attached two of the walls of the enclosure.

Referring now to FIGS. 6A and 6B, according to some embodiments, the structure 100 comprises a roof 166 that, just like the walls 146A-D, is comprised of a plurality of panels, such as panel 102.

The roof 166 panels define an outer edge of apertures 168. This outer edge of apertures 168 is formed from apertures of top and edge flanges of the panels that comprise the roof 166. Two portions of the outer edge of apertures 168 are comprised of edge flange apertures, and the other two portions of the outer edge of apertures 168 are comprised of top flange apertures.

The enclosure formed by walls 146A-D defines an upper edge of apertures 170. The upper edge of apertures 170 is formed entirely from apertures of top flanges of the panels of the walls 146A-D.

When the roof 166 is mated with the walls 146A-D the outer edge of apertures 168 of the roof 166 and the upper edge of apertures 170 of the walls 146A-D align. L-shaped channels (such as channels 150 and 152 of FIG. 5) are used to join the roof 166 to the walls 146A-D. Fasteners are used to join the roof 166 to walls 146A-D using the L-shaped channels.

Returning briefly to FIG. 2A, each panel may comprise vent holes 172 that provide ventilation and exchange of air into the structure 102. A cover plate 174 (FIG. 2B) that prevents wind-blown debris from entering the vent holes 172 can cover the vent holes 172.

Figure 7:
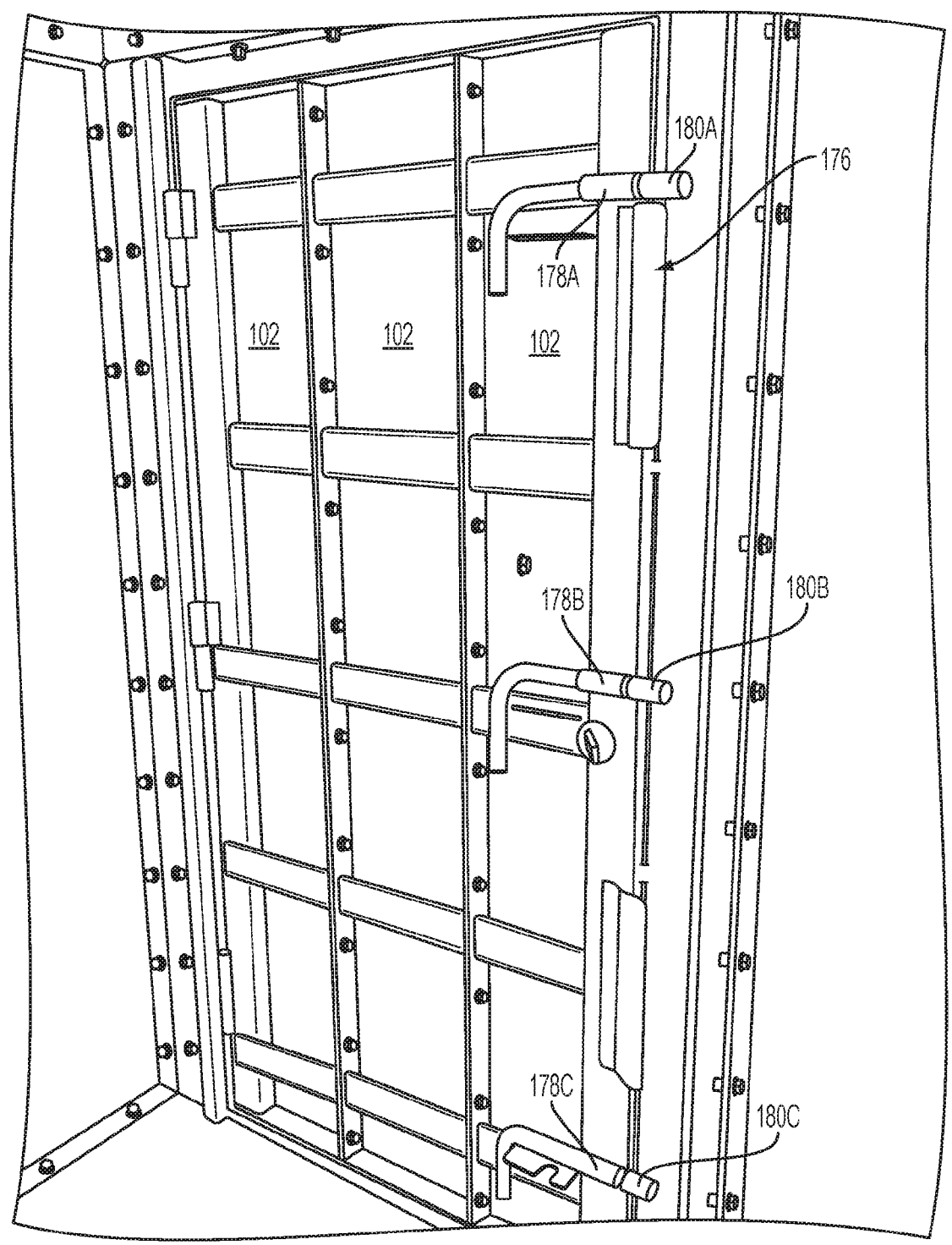
FIG. 7 is a perspective view of a door, constructed from a plurality of panels, and installed into a wall of the structure of FIG. 1.

FIG. 7 illustrates an example door 176, constructed from a plurality of panels, such as panel 102. The panels are hingedly connected to a portion of a wall. The door 176 is also lockingly couplable to another panel of the wall. The door 176 is provided with sliding J-bolts 178A-C that cooperate with latches 180A-C, respectively, in the adjacent panel. The door 176 can be secured using the J-bolts 178A-C. A secondary lock such as a deadbolt can also be used to secure the door 176.

Figure 8:
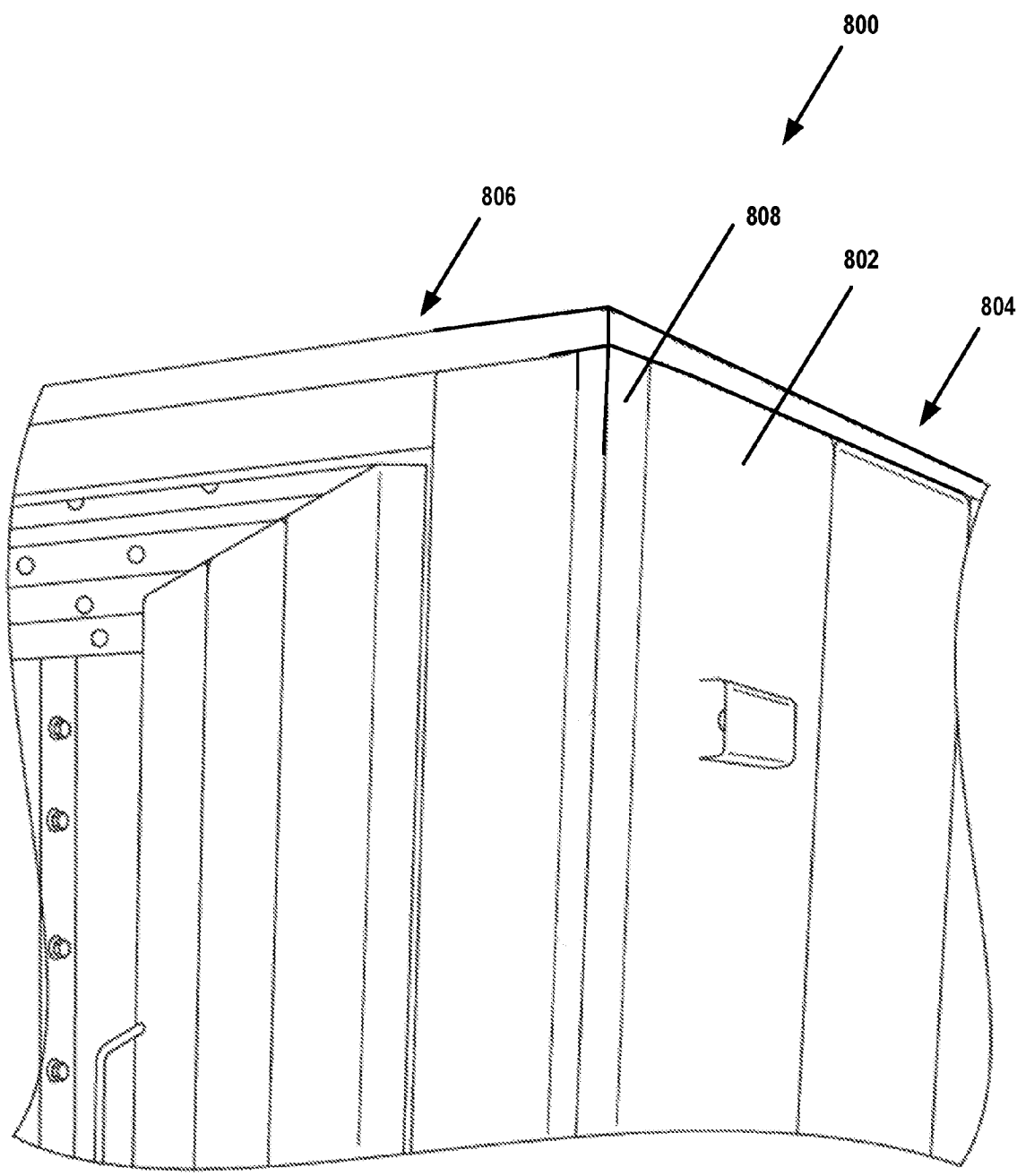
FIG. 8 illustrates another example enclosure comprising L-shaped corner members.

Referring now to FIG. 8, a portion of an example enclosure 800 is illustrated. The enclosure is fabricated using any of the panels described above, such as panel 802. Walls, such as wall 804, are constructed from a plurality of panels. Whereas in embodiments above, walls are connected or coupled using L-shaped brackets, the walls are joined using an L-shaped corner member. For example, wall 804 and wall 806 are joined using an example L-shaped corner member 808. In contrast with the embodiments above that use L-shaped brackets using fasteners that are accessible from the outside of the enclosure (see FIG. 1), the L-shaped corner members present flanges and apertures that mate with end flanges of end panels of walls 804 and 806.

Figure 9:
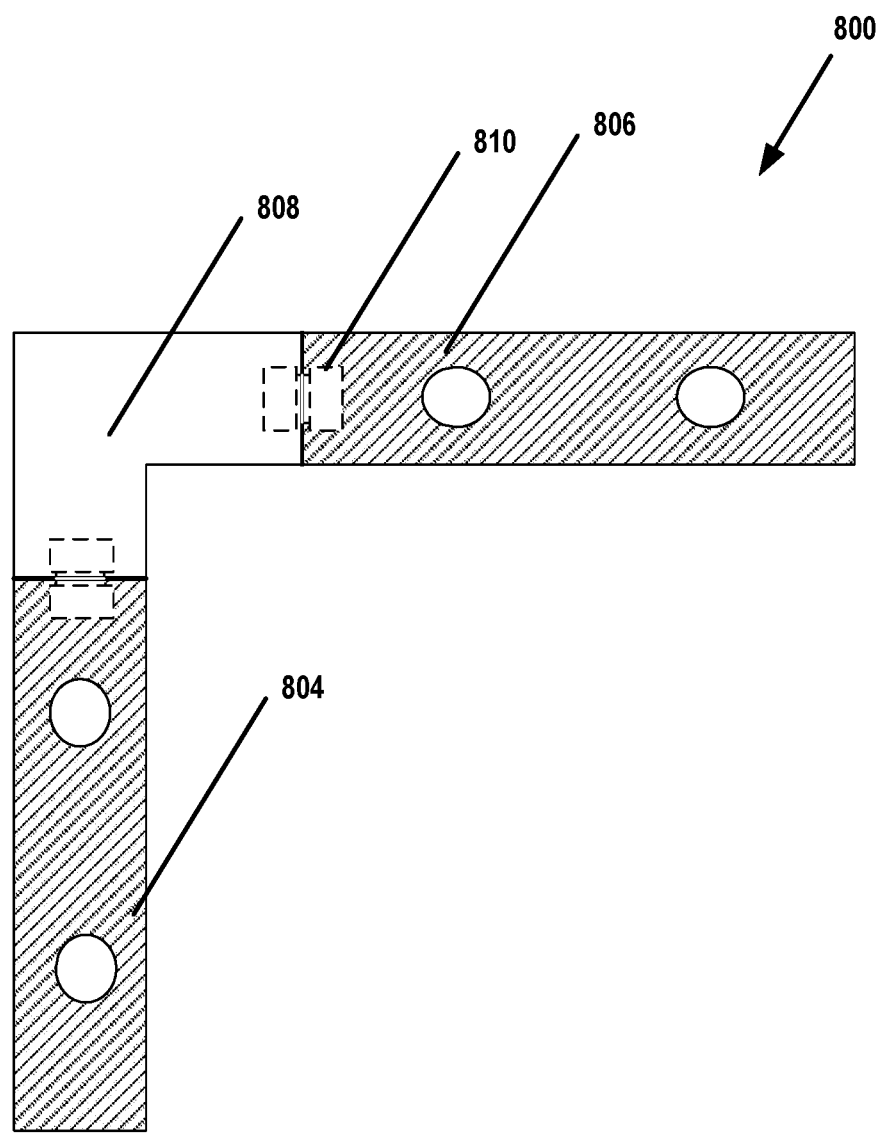
FIG. 9 is a top plan view of two panel walls of the enclosure of FIG. 8 coupled using an L-shaped corner member.

FIG. 9 illustrates an example top down view of the enclosure 800 with a top wall or panel removed. In this view wall 804 and wall 806 are coupled using an L-shaped corner member 808. Fasteners, such as fastener 810 are used to couple the walls to the L-shaped corner member 808.

Figure 10:
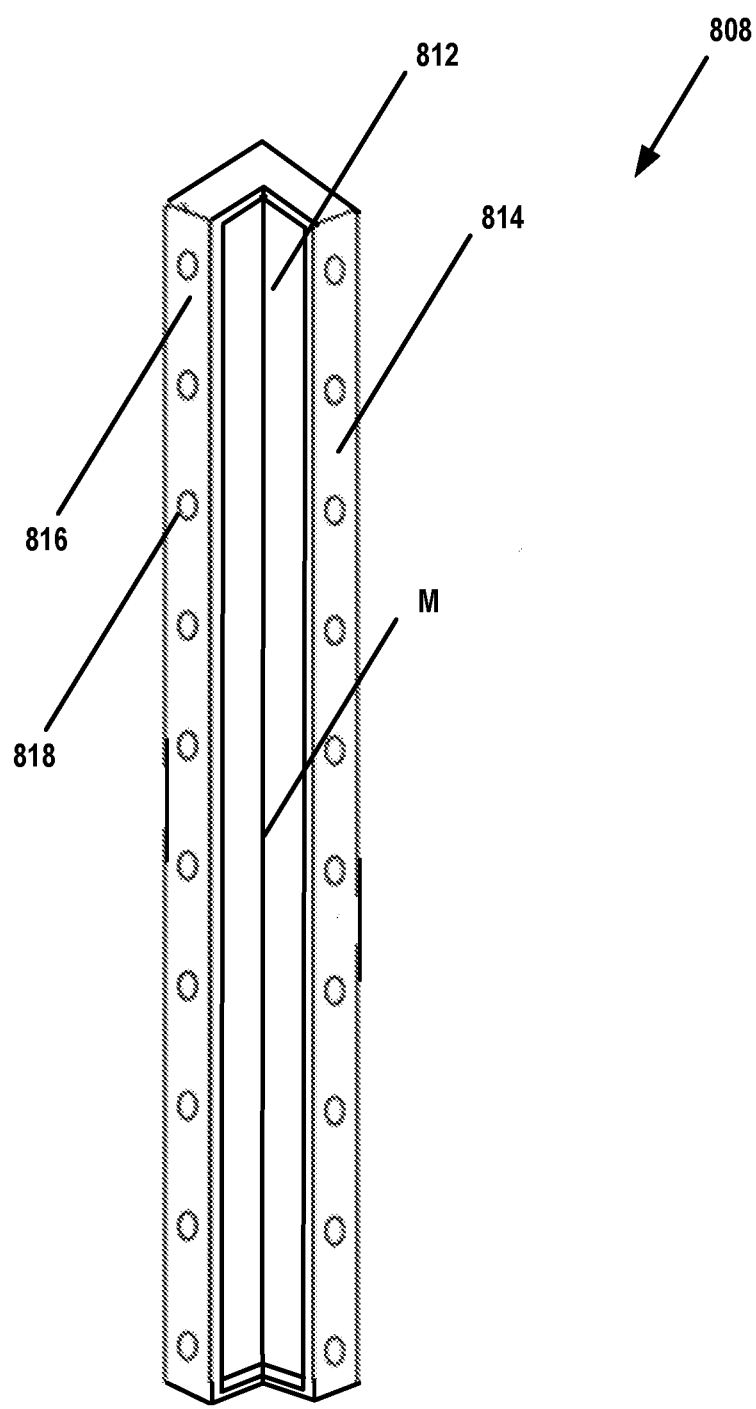
FIG. 10 is a perspective view of an example L-shaped corner member.

In FIG. 10, an example L-shaped corner member 808 is illustrated. The L-shaped corner member 808 comprises a body 812, a first end flange 814, and second end flange 816. Each of the end flanges 814 and 816 comprise a plurality of apertures, such as aperture 818. The spacing of the apertures conforms to any of the spacing patterns described throughout this disclosure.

Figure 11:
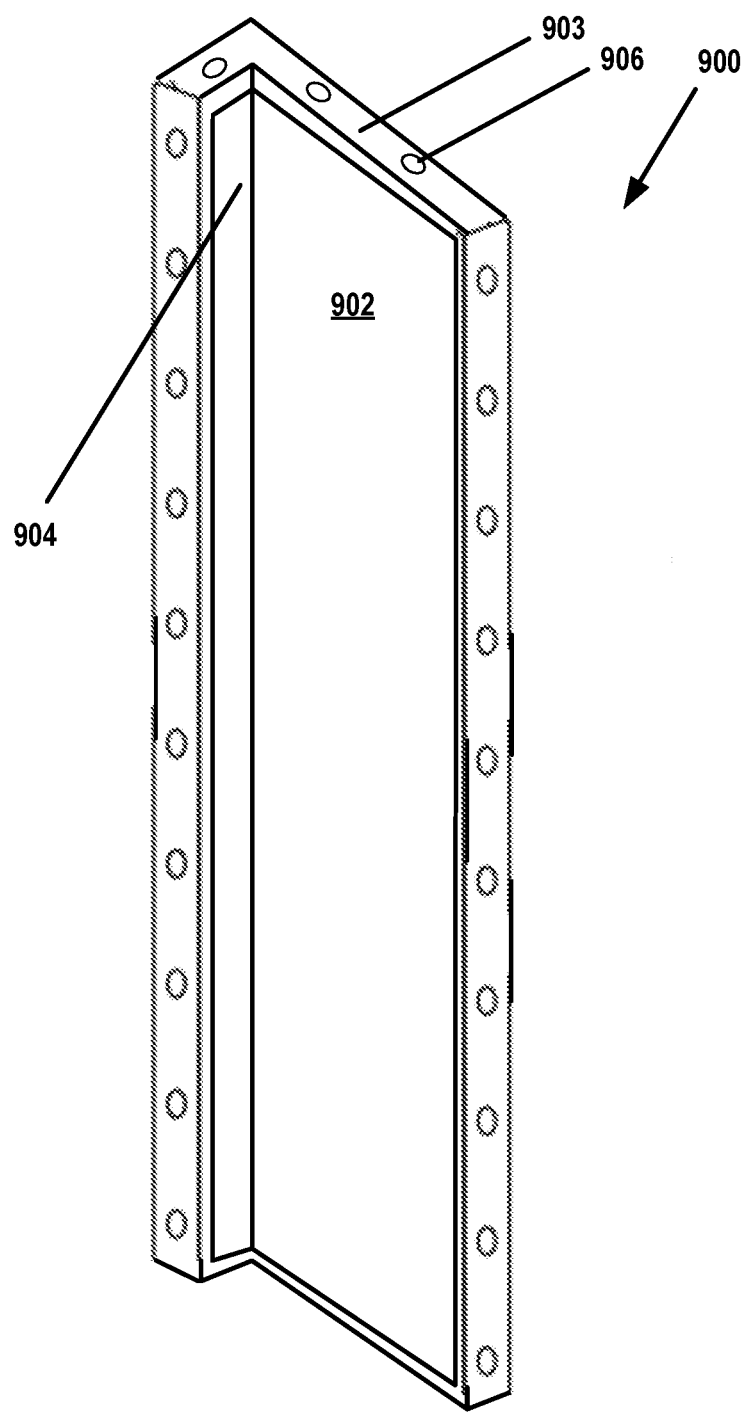
FIG. 11 is a perspective view of another example L-shaped corner member.

The end flanges 814 and 816 are positioned to connect two walls (such as walls 804 and 806 in FIGS. 8 and 9) together. Thus, fasteners can be installed between L-shaped corner members and two separate panel walls from an interior of the enclosure. This is advantageous when installing the enclosure in an interior space, such underneath a stairway or in a closet. That is, using L-shaped brackets as described in other embodiments may not be advantageous in instances where installers cannot access an outside of the enclosure. In one embodiment, the L-shaped corner member 808 can be fabricated from one of the panels described above through bending the universal panel to form a right angle about its midline M. Other shaped and configured corner members are also contemplated. For example, FIG. 11 illustrates another example panel 900 that includes a first side 902 that is longer than a second side 904. In some embodiments, an upper flange (such as upper flange 903 of first side 902) of either side 902 or 904 can comprise apertures such as aperture 906 that can serve as alignment and securement points for joining top wall panels thereto.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may occasionally be interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its nonitalicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected," "connecting," "mechanically connected," etc., are used interchangeably herein to generally refer to the condition of being mechanically/physically connected, either directly or indirectly.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. An enclosure, comprising:
   four walls comprised of a plurality of panels, each panel comprising:
      a sheet of metal having a length, width, a top flange, a bottom flange, a first edge flange, and a second edge flange, the first edge flange comprising a first plurality of apertures located in spaced apart relation along a first plane of symmetry of the panel, the second edge flange comprising a second plurality of apertures located in spaced apart relation along a second plane of symmetry of the panel, wherein a first of the first plurality of apertures of the first edge flange is located at a distance that is approximately one twentieth of the length of the panel from a top end of the panel, a last of the first plurality of apertures of the first edge flange is located at a distance that is approximately one twentieth of the length of the panel from a bottom end of the panel, wherein a first of the second plurality of apertures of the second edge flange is located at a distance that is approximately one twentieth of the length of the panel from the top end of the panel, a last of the second plurality of apertures of the second edge flange is located at a distance that is approximately one twentieth of the length of the panel from the bottom end of the panel;
   wherein the plurality of panels are arranged side-to-side in such a way that the second plurality of apertures of the second edge flange of one panel of the first plurality of panels are aligned with the plurality of apertures of the first edge flange of an adjacent panel;
   wherein the plurality of panels are arranged into the four walls each of the four walls comprising a first end panel having a first end flange that is not joined to another discrete panel on the first end flange and a second end panel having a second end flange that is not joined to another discrete panel on the second end flange, and L-shaped corner members join only two of the four walls together, wherein each said L-shaped corner member comprises apertures that mate with the first end flange of the first end panel of one of the walls and the second end flange of the second end panel of a second one of the walls; and
   wherein the four walls are arranged to form the enclosure in such a way that all apertures are disposed in an interior of the enclosure.

2. The enclosure according to claim 1, wherein remaining apertures of the first plurality of apertures of the first edge flange are spaced equidistantly and adjacently from one another and the first of the first plurality of apertures and the last of the first plurality of apertures of the first edge flange, further wherein remaining apertures of the second plurality of apertures of the second edge flange are spaced equidistantly and adjacently from one another and the first of the second plurality of apertures and the last of the second plurality of apertures of the second edge flange, wherein the spacings are sized such that when adjacent panels are joined together with fasteners, the adjacent panels are collectively configured to withstand an impact force of debris from an F-5 tornado.

3. The enclosure according to claim 1, further comprising a fastener inserted through each of the aligned apertures.

4. The enclosure according to claim 1, wherein remaining apertures of the first plurality of apertures of the first edge flange are spaced equidistantly and adjacently from one another and the first of the first plurality of apertures and the last of the plurality of apertures of the first edge flange.

5. The enclosure according to claim 4, wherein remaining apertures of the second plurality of apertures of the second edge flange are spaced equidistantly and adjacently from one another and the first of the second plurality of apertures and the last of the second plurality of apertures of the second edge flange.

6. The enclosure according to claim 1, further comprising a pair of apertures located in the top flange, a first of the pair of apertures being spaced apart from a first edge of the top flange at a distance that is approximately one twentieth of the length of the panel and a second of the pair of apertures being spaced apart from a second edge of the top flange at a distance that is approximately one twentieth of the length of the panel.

7. The enclosure according to claim 6, further comprising a pair of apertures located in the bottom flange, a first of the pair of apertures being spaced apart from a first edge of the bottom flange at a distance that is approximately one twentieth of the length of the panel and a second of the pair of apertures being spaced apart from a second edge of the bottom flange at a distance that is approximately one twentieth of the length of the panel.

8. The enclosure according to claim 7, further comprising a plurality of vents.

9. The enclosure according to claim 1, further comprising a top wall constructed from a third plurality of panels, the top wall being placed on top of the enclosure such that top flanges of third plurality of panels are aligned with top flanges of the at least a portion of the four of walls.

10. The enclosure according to claim 9, further comprising a door constructed from a fourth plurality of panels.

11. The enclosure according to claim 10, wherein a wall of the four walls comprises the door, the door being hingedly attached to one panel of the wall and lockingly couplable to another panel of the wall.

12. The enclosure according to claim 11, wherein the door is lockingly coupled using a plurality of bolts that selectively engage with another panel of the wall.

13. An enclosure, comprising:
   four walls comprised of a plurality of panels, each panel comprising:
      a sheet of metal having a length, width, a top flange, a bottom flange, a first edge flange, and a second edge flange, the first edge flange comprising a first plurality of apertures located in spaced apart relation along a first plane of symmetry of the panel, the second edge flange comprising a second plurality of apertures located in spaced apart relation along a second plane of symmetry of the panel, wherein a first of the first plurality of apertures of the first edge flange is located at a distance that is approximately one twentieth of the length of the panel from a top end of the panel, a last of the first plurality of apertures of the first edge flange is located at a distance that is approximately one twentieth of the length of the panel from a bottom end of the panel, wherein a first of the second plurality of apertures of the second edge flange is located at a distance that is approximately one twentieth of the length of the panel from the top end of the panel, a last of the second plurality of apertures of the second edge flange is located at a distance that is approximately one twentieth of the length of the panel from the bottom end of the panel;
   wherein the plurality of panels are arranged side-to-side in such a way that the second plurality of apertures of the second edge flange of one panel of the first plurality of panels are aligned with the plurality of apertures of the first edge flange of an adjacent panel;
   wherein the plurality of panels are arranged into the four walls each of the four walls comprising at least one panel having a first end flange that is not joined to another discrete panel on the first end flange and a second end panel having a second end flange that is not joined to another discrete panel on the second end flange, and L-shaped corner members join only two of the four walls together, wherein each said L-shaped corner member comprises apertures that mate with the first end flange of the at least one panel of one of the walls and the second end flange of the second end panel of a second one of the walls; and
   wherein the four walls are arranged to form the enclosure.

14. The enclosure according to claim 13, wherein one of the L-shaped corner members comprises a panel which has been bent at a right angle relative to a midline of the panel.

15. The enclosure according to claim 13, further comprising a fastener inserted through each of the aligned apertures.

16. The enclosure according to claim 15, wherein the all apertures of the enclosure are disposed in an interior of the enclosure such that none of the fasteners require securement from outside the enclosure.

* * * * *